5989X
PATENTED MAY 22, 1830.
R. KINGSBURY.
SCREW COG FOR SHIPS' BLOCKS.
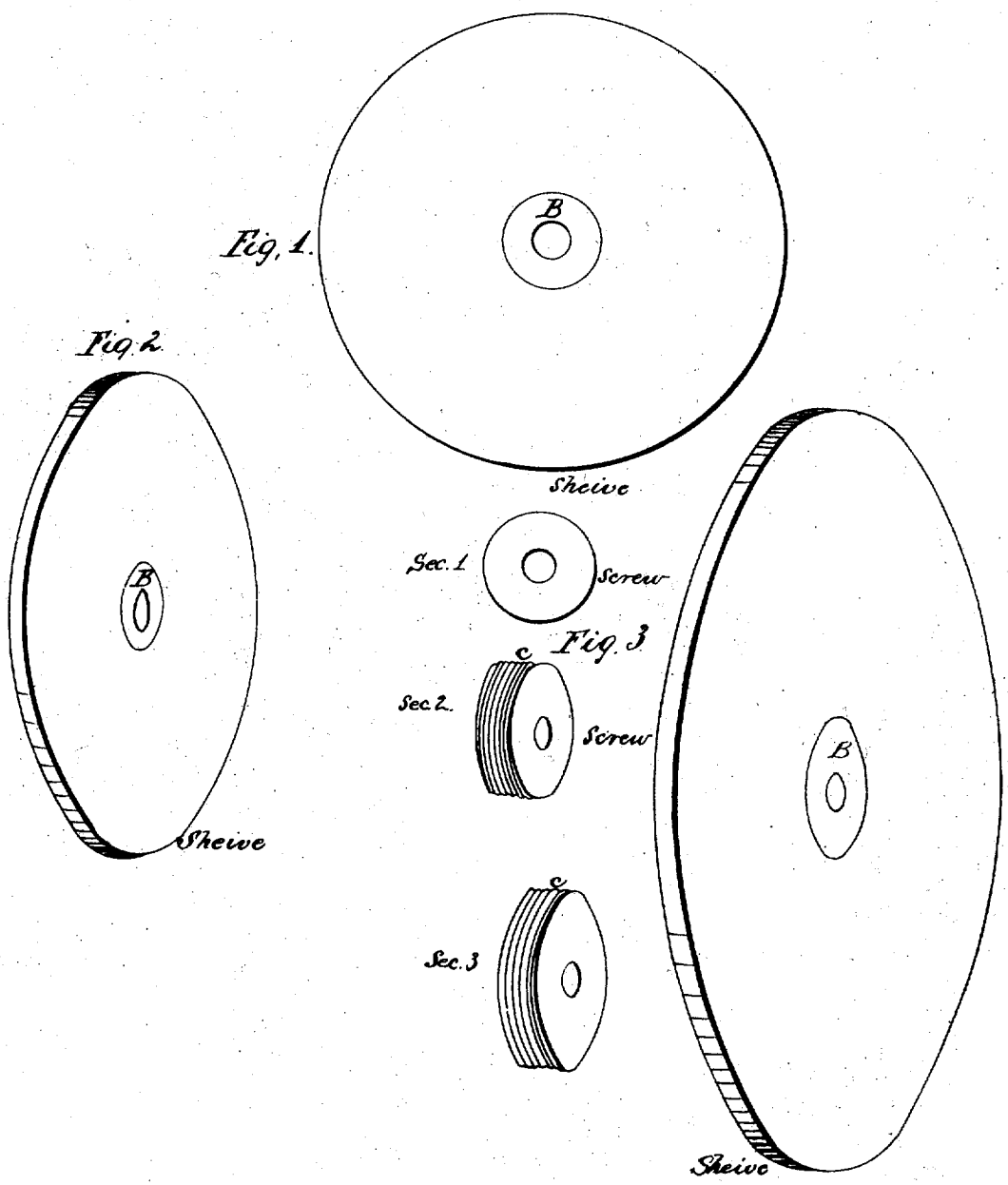

X5484 May 22 1850

Rhodes Kingsbury of Bath State of Maine

Letters Patent.

The schedule referred to in these Letters Patent and making part of the same containing a description in the words of the said Rhodes Kingsbury himself of his improvement, being a screw cog or Bush for cogging shives in ships blocks and for other purposes To all to whom these presents shall come Be it known, that I Rhodes Kingsbury of Bath in the County of Lincoln and State of Maine, have invented a new and useful improvement being a screw cog or bush for cogging shives in ships blocks and other similar articles and the application of the screw to such cogs or bushes, for the purpose of fitting the same and that the following is a full and exact description of the construction, and fitting and operation of said Machine as invented or improved by me, The cog or bush is a cylinder and its length is equal to the thickness of the shive, or thing to be cogged or bushed, and whose diameter is one sixteenth of an inch or thereabouts longer than the diameter of the hole to be cogged or bushed. On the outside of the cog or bush, is cast or cut a screw by which the cog or bush is drawn into the shive, or thing to be cogged, and which fastens the cog to the shive, or in other words the cog or bush invented by me, is a screw whose length is equal to the thickness of the thing to be cogged, and of such size as to ~~[illegible]~~ firmly into the hole of the shive or thing to be cogged and the invention consists principally in the application of the screw to cogs for shives of ships blocks, but the same may be applied to cogs or bushes for other things. The invention is more particularly described in the drawing hereunto an[illegible] [illegible] Fig 1st. Fig 2d and Fig 3d represent the screw cog

X3489 invented by me. Fig 1st Fig 2d & Fig 3d are shivs B.B.B, are screw cogs fitted to the shivs, screwed into them in the manner of my invention C.C. are screws or the thread of a screw, cast or cut on the rim of the cog, and which draw the cog into the hole of the shive. The screw cog or bush is intended generally to be used for cogging shivs of Ships blocks of all kinds, and other similar articles that run on iron pins or journals; and can be made of iron or composition, either by casting or working and cutting. It differs from the common cog or bush in this, that it has no plate, and does not require rivetting to the shive, The common cog is sunk the thickness of the plate into the shive, and the plate being about one third of the circumference of the shive and about a third of its thickness and in a triangular form is rivetted through the shive at the angles. The method of letting the plate cog into lignum vitae, is difficult; the wood being hard, it is almost impossible to let them in tight, they soon wear loose and become useless. the plate being let in on one side of the shive tends to cant the shive in the shell of the block, as the strain comes on one side of the shive: the shive is necessarily cut so thin to receive the plate that the rivets have but little support, they often crack the shive and render it useless or become loose, and a shive once cogged in this way cannot again be cogged. The following are some of the advantages of the screw cog, or bush, as invented by me. It has no plate to weaken the shive, it requires no rivetting but can be screwed into the hole of the lignumvitae shive, the hole being ~~boared about one sixteenth of an inch smaller than the~~ cog, the thread of the screw cutting into the shive so that they become perfectly firm & tight and stationary and will not wear loose. The screw cog can be made with as little expense as the common plate cog and [illegible] fitted to the shive, with much less expense. It may be [illegible] [illegible]

into the shive with a square steel reamer, now in common use for reaming out iron cogs. The screw cog can be applied to all the shives in all the blocks of the ship, whereas the plate cog can only be applied to shives of the larger size; it may also be applied to shives whose pin holes have been worn so large as to be unfit for use, and to such as have had their pin holes worn oblong and thus become useless. — But the principal advantage of the screw cog is the saving of expense, It can be fitted to the shive for less than one fourth part of the expense of fitting the plate cog.

What I claim as new and as my own invention or discovery in the above described Machine, and for which I ask an exclusive privilege, is the screw cog or bush for shives and other articles, and the application of the screw to the cog or bush for fitting the same to shives and other articles.

Witness
Elisha Pleutler
Joseph Sewall

Rhody Kingsbury

Exd.
ChfW.

948 [illegible]